United States Patent [19]

Hyun et al.

[11] Patent Number: 5,937,413
[45] Date of Patent: Aug. 10, 1999

[54] DATA AUDITS BASED ON TIMESTAMP CRITERIA IN REPLICATED DATA BASES WITHIN DIGITAL MOBILE TELECOMMUNICATION SYSTEM

[75] Inventors: Eun-Hee Hyun; Sung-Hee Kim, both of Daejeon, Rep. of Korea

[73] Assignee: Electronics and Telecommunications Research Institure, Daejeon, Rep. of Korea

[21] Appl. No.: 08/965,767

[22] Filed: Nov. 7, 1997

Related U.S. Application Data

[63] Continuation-in-part of application No. 08/564,660, Nov. 29, 1995, abandoned.

[30] Foreign Application Priority Data

Nov. 30, 1994 [KR] Rep. of Korea ................... 94-32103

[51] Int. Cl.$^6$ ................................................ G06F 17/30
[52] U.S. Cl. .................. 707/201; 707/202; 707/203; 707/10; 707/8; 455/433; 455/413; 395/182.18; 395/200.33
[58] Field of Search ................ 707/1, 7, 8, 10, 707/201, 202–203; 455/413, 433; 395/182.18, 200.33

[56] References Cited

U.S. PATENT DOCUMENTS

| | | | |
|---|---|---|---|
| 5,537,594 | 7/1996 | Shannon et al. | 395/680 |
| 5,561,854 | 10/1996 | Antic et al. | 455/433 |
| 5,579,375 | 11/1996 | Ginter | 455/433 |
| 5,627,877 | 5/1997 | Penttonen | 455/413 |

OTHER PUBLICATIONS

Electrical Communication; GSM Network Systems and Overall System Integration; M. Feldman, J.P. Rissen, pp. 141–154, Jun. 1993.

"Service Control Point (SCP) for the GSM and Personal Communications Systems", A Athanaopulos and N. Risidore, ORBITEL Mobile Communications Ltd., UK, Telecommunications, 1990, IEE Conf. Pub. 331, Jun. 1991.

"The (GSM) HLR—Advantages and Challenges", Bent Gabelgaard, Dansk MobilTelefon I/S, Denmark, Universl Personal Communications, 1994 3rd Int'l, Apr. 1994.

*Primary Examiner*—Thomas G. Black
*Assistant Examiner*—Hosain T. Alam
*Attorney, Agent, or Firm*—Jacobson, Price, Holman :& Stern, PLLC

[57] ABSTRACT

The present invention provides a method which uses a data audit function in order to maintain a consistency about a plurality of data stored as a replication data among data base nodes consisting of a mobile communication system. The method for auditing data based on timestamp criteria in replicated data bases in a digital mobile telecommunication system includes the steps of: (a) when there is a database access request, setting a time stamp about tuple accessed by the request, and managing a start, suspend, stop and resume events for a audit process; (b) managing a current status of the audit process, and information necessary for scanning each tuple; and (c) managing a request queue for the data base and CPU load. Accordingly, the present invention satisfies a system basic requirement being a real-time access in a mobile communication system including at least two data bases, maintains a consistency between two data replicated to each other, accurately controls a relationship between a mobile subscriber and a mobile terminal, and removes the incorrect data and the garbage data which may occur in a system operation, thereby effectively using the data base resource.

6 Claims, 8 Drawing Sheets

Data Audit Process

DATA AUDITS BASED ON TIMESTAMP CRITERIA IN REPLICATED DATA BASES WITHIN DIGITAL MOBILE TELECOMMUNICATION SYSTEM

This is a Continuation-In-Part application of Ser. No. 08/564,660, filed Nov. 29, 1995, now abandoned.

BACKGROUND OF THE INVENTION

1. Field of the Invention

The present invention relates to a method for detecting and clearing a data inconsistency between the replicated data stored in two data bases of storing a mobile terminal information and a mobile subscriber information.

2. Description of the Conventional Art

The digital mobile communication system generally includes a plurality of data base nodes for storing and managing the information for a mobile service, and the term of each of the database nodes is Home Location Register (hereinafter referred to as HLR), and Visitor Location Register (hereinafter referred to as VLR) and Equipment Identity Register (hereinafter referred to as EIR).

When mobile subscribers want to use a mobile service, the HLR performs a function for registering or cancelling the information of the mobile subscribers requiring the mobile service.

The VLR is a local data base of a location on which the subscribers registered in the HLR are currently positioned, and performs a data input function or a data output function by a movement of the subscribers.

The EIR is a data base for storing and managing information fort the mobile terminal owned to the subscribers for a mobile service, while the HLR and the VLR are data bases for storing the information of the mobile subscriber.

Functions and interface standards with regard to the above data bases are in detail described in a recommendation for the mobile communication system, such as a GSM, CCITT, or JDC et al. Presently, many countries respectively construct a mobile communication system, and implements the system components needed to the mobile communication system on the basis of the standards described in the recommendation.

The HLR and the VLR among the data base nodes consisting of a mobile communication system manage all data on the basis of a mobile subscriber identification number called as a Mobile Description Number (hereinafter referred to as MDN).

The EIR stores data on the basis of a mobile terminal identification number called as Equipment Serial Number (hereinafter referred to as ESN).

Accordingly, the EIR stores the mobile subscriber identification number stored in the HLR or VLR, and the HLR or VLR replicates the mobile terminal identification number stored in the EIR and stores it. So, they (HLR, VLR and EIR) all share a mutual information therebetween during a data search process.

As a result, to satisfy a real-time data base access which is a requisite for a mobile communication service, a data replication is indispensable. To quickly and correctly perform the mobile service, a consistency about the replicated data (or replication data) should be maintained.

The consistency for the replication data which is present between two data bases means that a data modification should be reflected to the other data base if the data modification occurs in one data base between the two data bases.

Therefore, the procedures for maintaining the consistency of the replication data stored in the two data bases are set and performed during the operation of a system.

However, two data bases on the procedures send or receive a requirement for the data modification through the medium of a communication path. At this time, an inconsistent data between two data bases may generate due to a message loss of the communication path, so that each data base should detect and correct the inconsistent data.

SUMMARY OF THE INVENTION

It is an object of the present invention to provide a method which uses a data audit function in order to maintain a consistency about a plurality of data stored as a replication data among data base nodes consisting of a mobile communication system.

The mobile communication system induces data modification demands which should be reflected to a plurality of data bases through the medium of a communication path in order to perform a mobile service. Such data modification demands are processed by an additional procedure among data base nodes. The purpose of the additional procedure is to maintain a consistency about the replication data stored in two data bases.

However, in order to maintain the consistency of the replication data by using this procedure, the two data bases should be all in a normal state and the components of obstructing a data transfer should not appear in the communication path between the two data bases.

Accordingly, if messages excessively generate due to a congestion of traffics for a location registration, some message may be lost in the communication path. Due to a data base overload, a message loss also generates.

To solve the problem, if a demand for modifying the data stored in one data base is delayed until its replication data stored in the other data base is updated, a message recovery procedure for re-transferring the lost message can be used. However, since the subscribers requiring a mobile communication service should receive a quick service regardless of a data property requesting a data replication, delaying a response against a data update request does not satisfy a system's basic requirement.

To satisfy the basic requirement of the system, the present invention does not delay the response, immediately returns a result after the data update request, and uses a data audit function to dissolve a data inconsistency caused by the communication path or an abnormal state.

BRIEF DESCRIPTION OF THE DRAWINGS

Further features and advantages will become more apparent from the following and a more particular description of the preferred embodiment of the invention, as illustrated in the accompanying drawings. Corresponding numerals and symbols in the different figures refer to corresponding parts unless otherwise indicated, and in which.

DETAILED DESCRIPTION OF THE INVENTION

The preferred embodiment of the present invention will become apparent from a study of the following detailed description, when viewed in light of the accompanying drawings.

Figure 1:
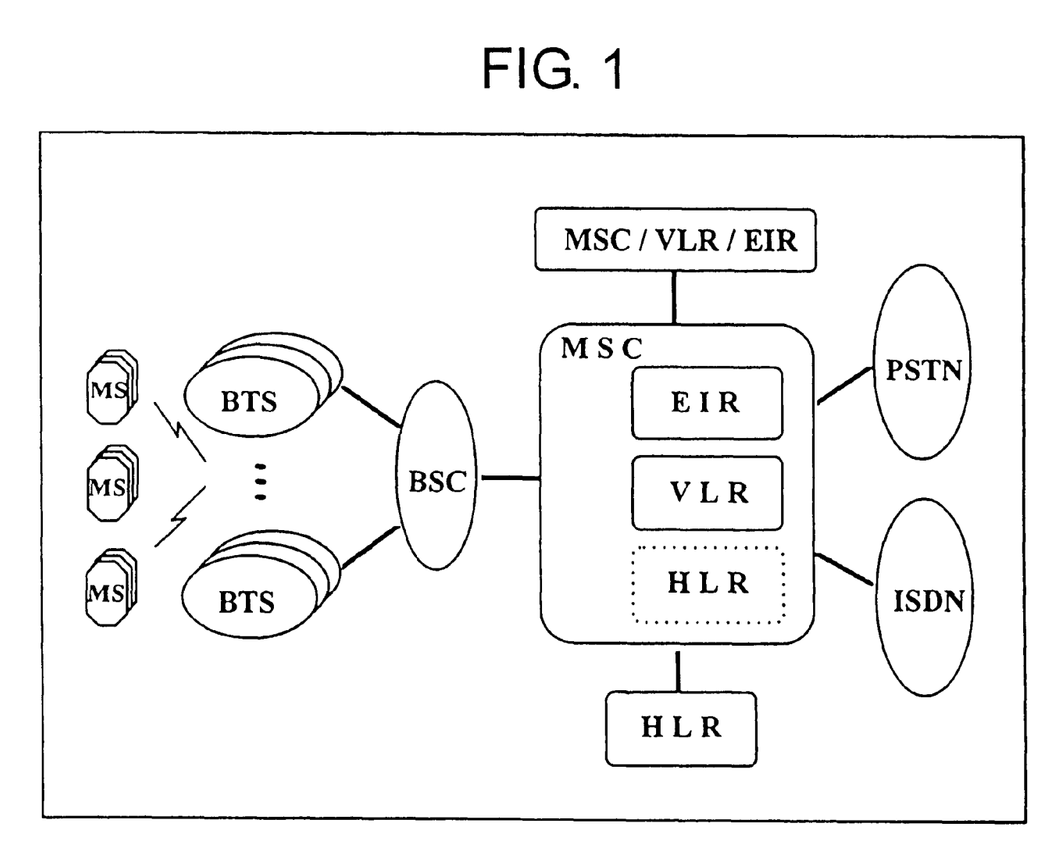
FIG. 1 illustrates the architecture of a mobile communication system used as an environment of the present invention.

FIG. 1 illustrates all of structure of the mobile communication system on the environment of the present invention.

Referring to FIG. 1, the mobile communication system called as a CDMA Mobile System (hereinafter referred to as CMS) includes: a mobile service switching center (MSC) which includes HLR and VLR functioned as a data base for storing and managing a mobile subscriber data, and EIR functioned as a data base for managing a mobile terminal data. Each of the HLR, VLR and EIR is made as a processor in the MSC.

The HLR can be constructed as a separate independence system. However, the separate independence system for the HLR is used in the MSC, only when the HLR is not implemented in the external part of the MSC in a step of constructing a real mobile communication network.

A public switched telephony network (PSTN) performs a service for the existing fixed subscribers, and an integrated service digital network (ISDN) provides a voice and data communication service to the communication network.

Various networks such as the above are connected to a mobile communication network through the MSC. The MSC can also be operated in conjunction with other MSC in the same mobile communication network.

The MSC manages the switch as a mobile service switch for the mobile subscriber, and is in charge of linking with each of the subscribers.

A base station controller (hereinafter referred to a BSC) is in charge of the maintenance of the communication quality by the adjustment of the power level for transmittin(/receiving the radio channel, and manages both the hand-over and the radio resource within a cell of the cable/radio channel in order to effectively connect the subscriber to the network.

A base transceiver station (hereinafter referred to as BTS) is a radio equipment of the base station. A mobile station (hereinafter referred to as MS) is a car-phone or a personal phone et al. as the last terminal equipment using the mobile communication service.

Figure 2:
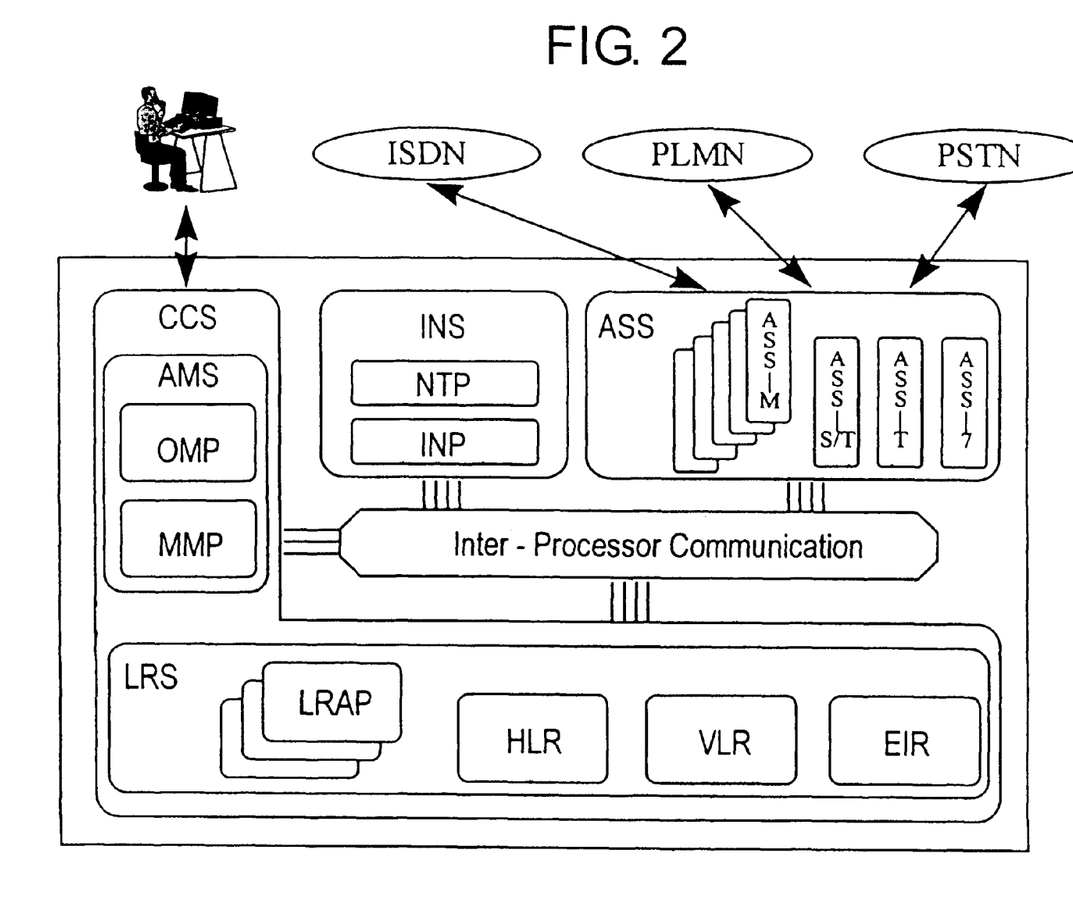
FIG. 2 illustrates the structure of a mobile service switching center (hereinafter referred to as MSC) of a CDMA mobile system (hereinafter referred to as CMS)

FIG. 2 illustrates the structure of TDX-10 MX being MSC including a plurality of location registers (LRs) and the EIR.

Referring to FIG. 2, the TDX-10 MX includes: the access switching subsystem (hereinafter referred to as ASS); the interconnection network subsystem (hereinafter referred to as INS); and the central control subsystem (hereinafter referred to as CCS).

The ASS provides the subscriber and the trunk interface function, performs a status management of the subscriber, and also provides a charging data generation function and various service functions.

ASS-M in the ASS performs an interface function and a service function for the mobile subscribers. ASS-S/T performs a matching function for the fixed subscriber. ASS-T controls a trunk matching between stations.

ASS-7 controls the No. 7 signalling between the switch and other network components. When other switch and the HLR to be remained in a digital mobile service network are embodied in the external part of the MSC, a data and signal transfer for the other switch and the HLR are performed in the ASS-7.

A MSC/VLR/EIR for communicating with the TDX-10 MX is a mobile service switch including the VLR and the EIR in the switch, like a TDX-10 MX.

A link network subsystem (hereinafter referred to as INS) performs an exchange of the data and the control message between the ASS and the CCS.

INP controls a switch network in general, and is in charge of the function for searching and managing a communication path using a space switch.

NTP performs a number translation and a route control. CCS is a subsystem generalizing the operation and maintenance function.

For a network management, OMP performs a maintenance function, a testing function, a measurement function, and a charging function, and also performs a serial operation and maintenance function associated with BSC.

MMP in the CCS controls an interactive I/O device between the operator and the operation center.

The hardware structure of the TDX-10 MX is comprised by adding a Location Register Subsystem (hereinafter referred to as LRS) functioned as a private subsystem for the mobile service to either the existing audio switch structure or ISDN switch structure.

The LRS is comprised with the elements for storing/managing the subscriber data during the mobile communication service. The LRS includes a plurality of data bases (i.e., the HLR, the VLR, and the EIR), and a plurality of processors which are exclusively responsible for the application program process as the front end processor of the data base for processing the application request in connection with the plurality of data bases HLR, VLR and EIR.

A location registration application (hereinafter referred to as LRAP) requires the information for the mobile subscriber, when a call processing function, a hand-over function, and a location updating function et al are processed. In this case, it performs an Inter-Processor Communication (hereinafter referred to as IPC) process in association with another processor, also performs the process about MAP and TCAP to process the No. 7 signalling between other switches, and transmits the information in LRDP to a desired position.

LRDP is the name of the processor representing all of the HLR, the VLR, and the EIR, and is a processor for storing and managing the information for the mobile subscriber and the mobile terminal. When accessing the data for the subscriber from the LRAP, the LRDP performs the process for a search/register/cancel/modification of the data. In addition, when updating the subscriber information, the LRDP has the function to periodically back up all data into the disk.

Each of the processors in LRS has the same hardware structure as the other processor within MSC, and uses a main memory data base to satisfy the real-time requirement.

Particularly, LRDPs manage the data for the mobile subscriber by maintaining the main memory of 64 Mbyte. Herein, when the mobile subscriber wants to receive a communication service while remaining at the initial registration area, the HLR stores information therefor. Also, when the mobile subscriber wants to receive the communication service at the state moved to the other area, the VLR manages information therefor.

However, the EIR stores information for all mobile terminals of the system in one data base without regard to the mobility of the subscribers, and performs a search and a modification for the stored information.

Of course, the information for all mobile subscribers are stored in one data base, but the mobility of each mobile station remains unchanged.

Therefore, the HLR/VLR/EIR et al. store a large amount of data, so that it has an additional configuration which is different from the memory configuration of the other processors within MSC.

The transmission of the data and the signal between the subsystems or between the processors is performed by the interprocessor communication (IPC) between the processors within MSC.

Figure 3:
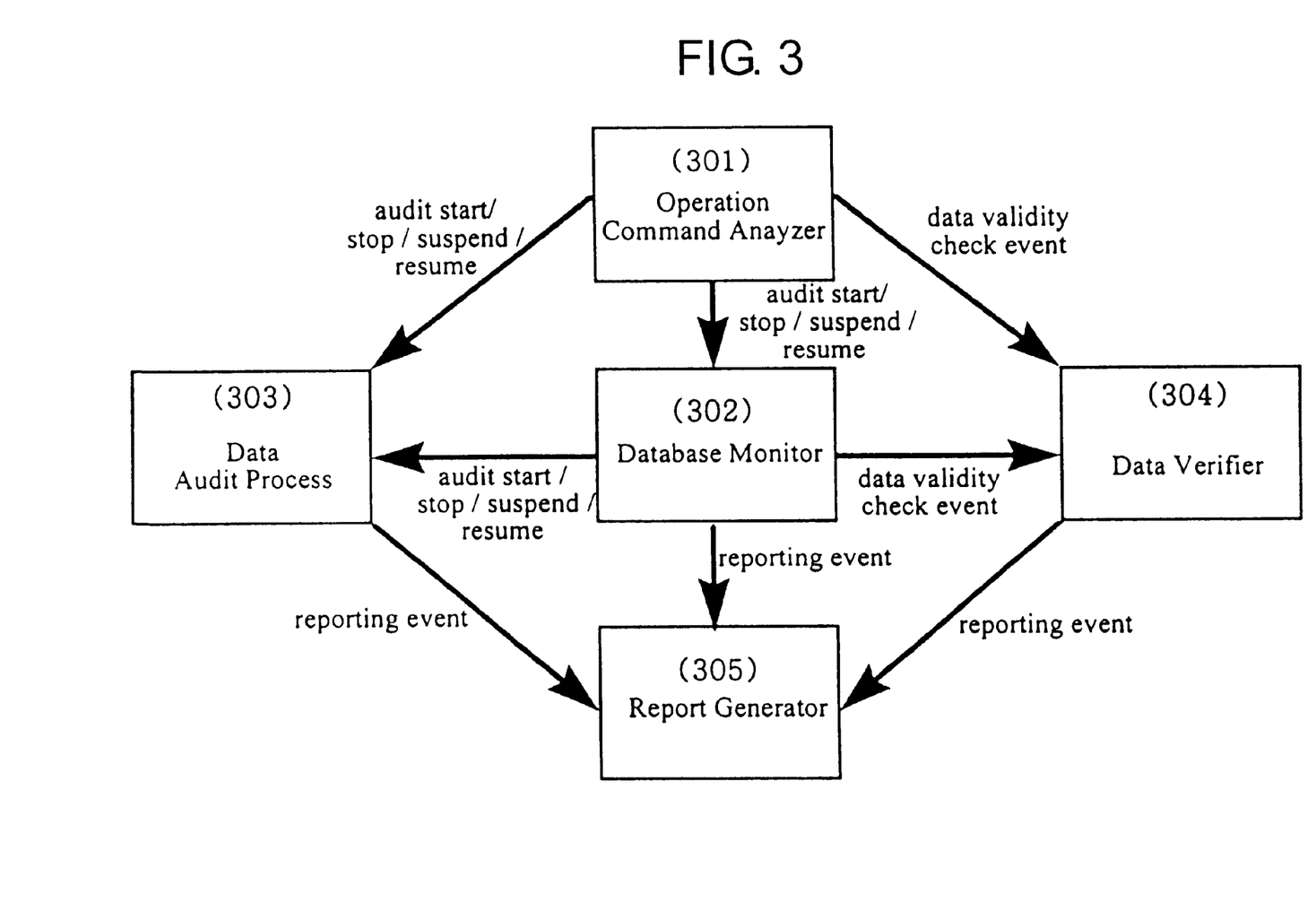
FIG. 3 illustrates the software modules implemented in the data bases for performing the data audit in the environment of the mobile communication system explained in FIGS. 1 and 2, and also illustrates an interaction between the software modules.

FIG. 3 illustrates the software modules implemented in the data bases for performing the data audit in the environment of the mobile communication system explained in FIGS. 1 and 2, and illustrates an interaction between the software modules.

Referring to FIG. 3, an operation command analyzer 301 receives a command from the operator for performing the audit function according to the operation command, analyzes the command, and then drives the necessary process. The operation command analyzer 301 can command the start, the stop, the suspend, the resume of the data audit process at a desired time point. If the result data of the audit is decided to be verified, the operation command analyzer 301 can require a validity check with respect to each data.

Since the operation command is the intended trial of the operator, the operation commands (i.e., the start, the stop, the suspend, and the resume requests) are directly transmitted to a data base audit process 303, and are also transmitted to a data base monitor 302 for the event management of the audit process.

The data base monitor 302 is activated in initializing the data base, performs a data base status monitoring and the event management based on the system parameter (e.g., the audit period and the data lifetime), activates the audit process and the data verification process, and is a core module reporting the data base status to the operator.

This module 302 determines the time having a minimum traffic load. In order to perform the data audit, the module 302 manages the value of a specific unit (e.g., one day, one week or one month) as a periodic information of the audit. the data audit process 303 is activated on the basis of the periodic information.

The period of the data audit can be designated as a system data at the initial time point of the data base, and can be changed by the operator during the operation of the system.

The data audit process 303's standard for determining the data stored in the data base as the invalid data or as the garbage data is the data lifetime which is defined by the system at the data base initial time point or indicated by the operator at the same point. The data lifetime defined by the present invention means the time at which a certain data can be present in the data base without a data access procedure.

If a time difference between the audit time point of a specific data and the previous accessed time point is beyond the system-defined lifetime or the operator-defined lifetime, this means that the mobile subscriber does not require the service during this time. Accordingly, the data base monitor 302 determines such data as the garbage data or the invalid data generated by the communication error.

The data audit process 303 is periodically activated by the system parameter managed by the data base monitor 302, or is activated by the operation command.

The data audit process 303 detects the incorrect data and the garbage data which are not accessed during the data lifetime, while searching the timestamp for each information stored in the data base. The data audit process 303 transmits the information about the incorrect and garbage data to both the data base monitor 302 and the report generator 305, and thus checks the validity of the data and reports it to the operator.

The data verifier 304 is the software module for checking the validity of the data which are not accessed during the data lifetime. If there is a data validity check request from the data base monitor 302 or the operation command analyzer 301, other data base (i.e., EIR data base) having the replicated data requires the information about the corresponding data from the VLR and HLR, and VLR or HLR data base requires the information about the corresponding data from the EIR. Then, the data verifier 304 verifies whether two data of two data bases are the same or not.

If the appropriateness of two data is not decided by the above procedure, the data verifier 304 provides the paging to all subscribers within the interest area. Then, based on a value obtained by its acknowledgement signal, the values stored in two data bases are updated or deleted.

A report generator 305 generates and transmits the result or signal which is transmitted to the operator or to the different module from the data base monitor 302, the data audit process 303, and the data verifier 304. The report generator 305 collects a result about the operation command, formats the result, and transmits it to the output port such as the operator terminal.

In addition, the report generator 305 transmits a result or modification of the environment generated when each process performs the inherent function to a different process, thereby inducing the interaction between each functions. Herein, the result or modification of the environment is indicated as a signal.

Figure 4:
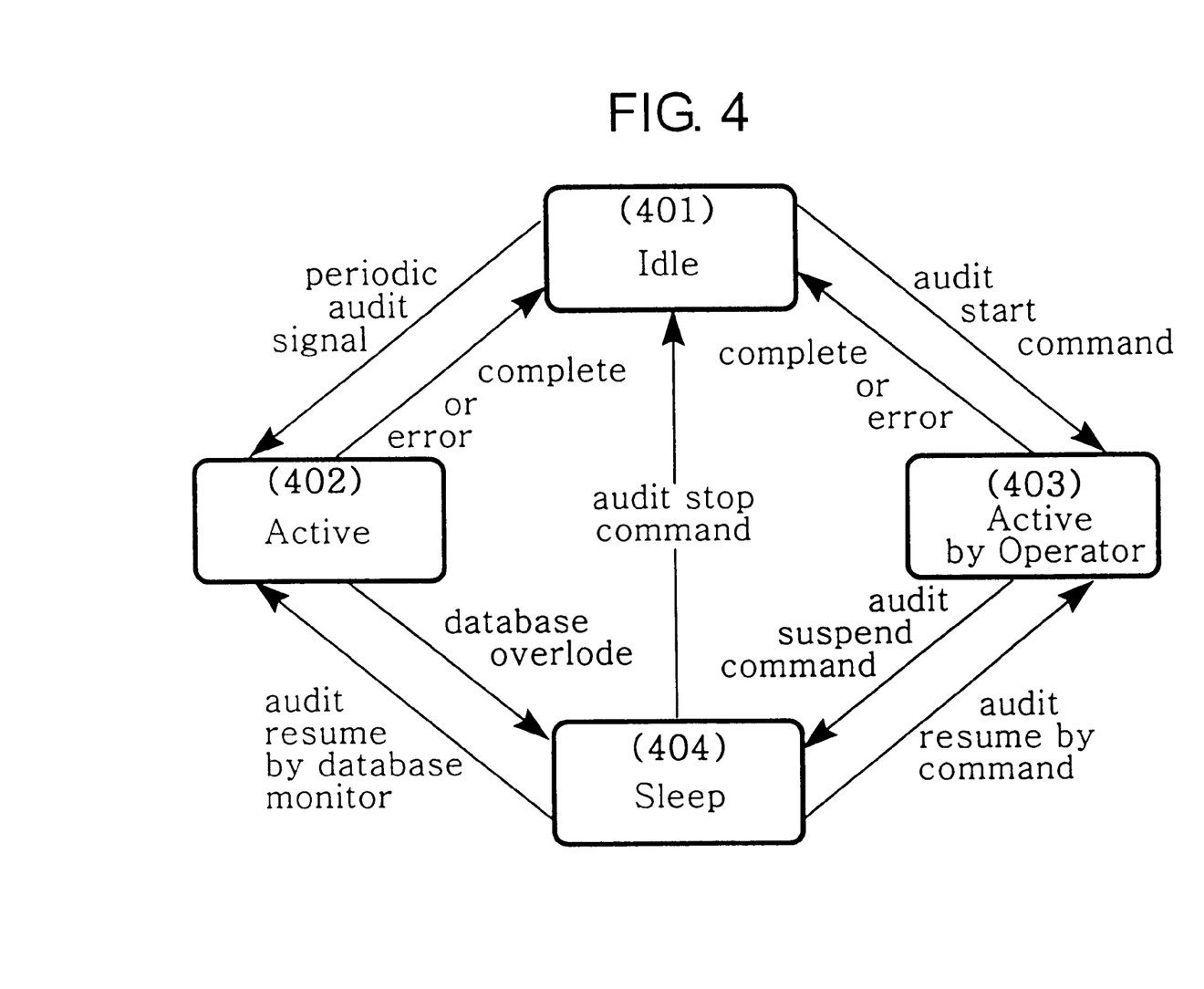
FIG. 4 illustrates a state transition diagram of the data audit process.

FIG. 4 illustrates a state transition diagram of the data audit process.

An idle state 401 indicates that there is no process in the data audit processor 303, is the state awaiting for coming in the period from the periodic timer connected to the data base monitor process 302 or the state awaiting for which the operator command is received.

The active state 402 means that the data audit process 303 is activated by the data base monitor 302 every audit period being a system parameter.

In the active state, the data audit process 303 performs the audit about the mobile subscriber or about the mobile terminal data, and determines a validity of a corresponding data.

Data auditing is performed by using both a timestamp which is set as a tuple unit every the data is accessed, and the time at which a corresponding tuple is accessed for auditing the data.

The data audit process 303 calculates a difference between a current time and the time stamp of each tuple. If the difference is beyond the data lifetime managed by the data base monitor 302, the data audit process 303 determines the data as an invalid data or a garbage data. If not, the timestamp of the corresponding tuple is updated to the current time, and a tuplo-auditing procedure is performed.

The active state by operator 403 has the same function as the active state 402, but it is activated by the operation command not the data base monitor 302.

Such two states 402 and 403 do not exist at the same time. When there is an error or a stop command in each state or when the data audit process is finished, the state is transitted to the idle state 401.

Finally, when the audit process is performed in the active state 402 or in the active state 403 by operator receives a suspend command from the operator, or when the data base is determined as an overload state, the sleep state 404 suspends the audit process for a while, and awaits that a resume command is input or the load of data base reduced. In this state, if the resume command is input or the data base load is lower than a predetermined level, the sleep state 404 is transitted to the active state 402 or the active state 403 by operator.

Also, if the sleep state 402 receives the audit stop command from the operator, stops the suspended data audit process, and is transitted to the idle state 401.

Figure 5:
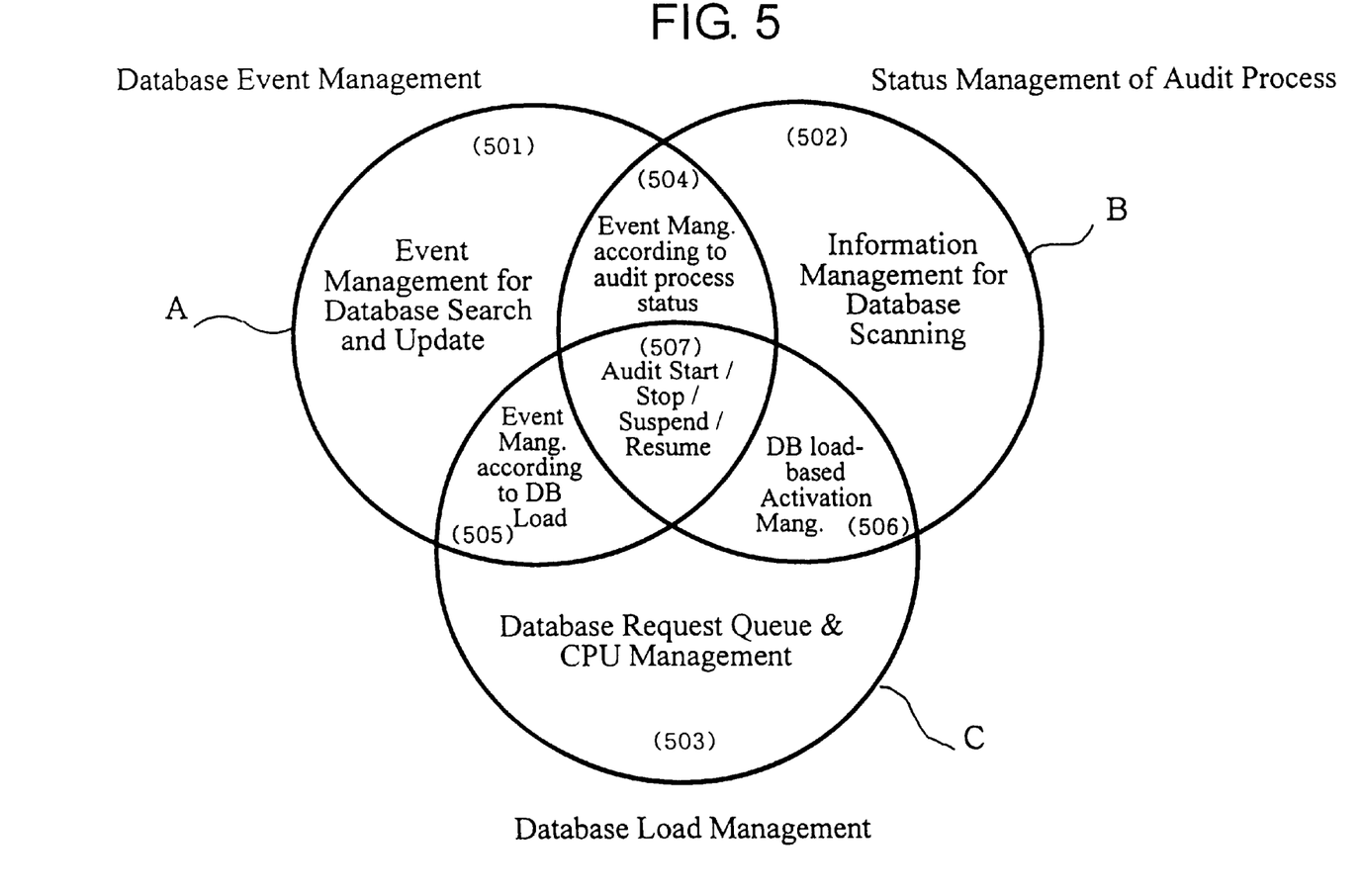
FIG. 5 illustrates functional modules of a data base monitor for auditing the data.
Figure 6A:
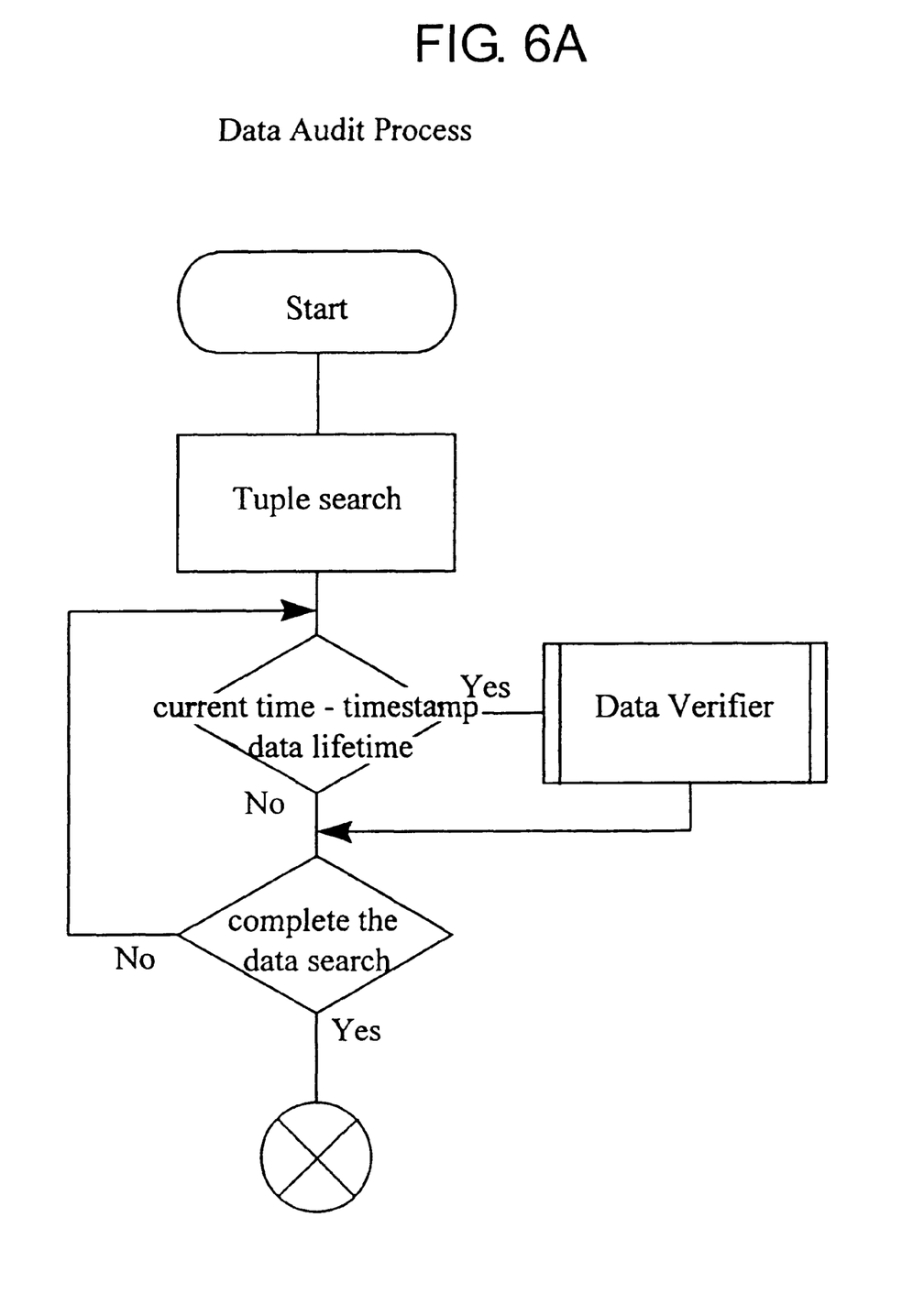
FIG. 6A–C is the flow chart of the data audit, a data verifier, and a data base monitor in the mobile telecommunication system.
Figure 6B:
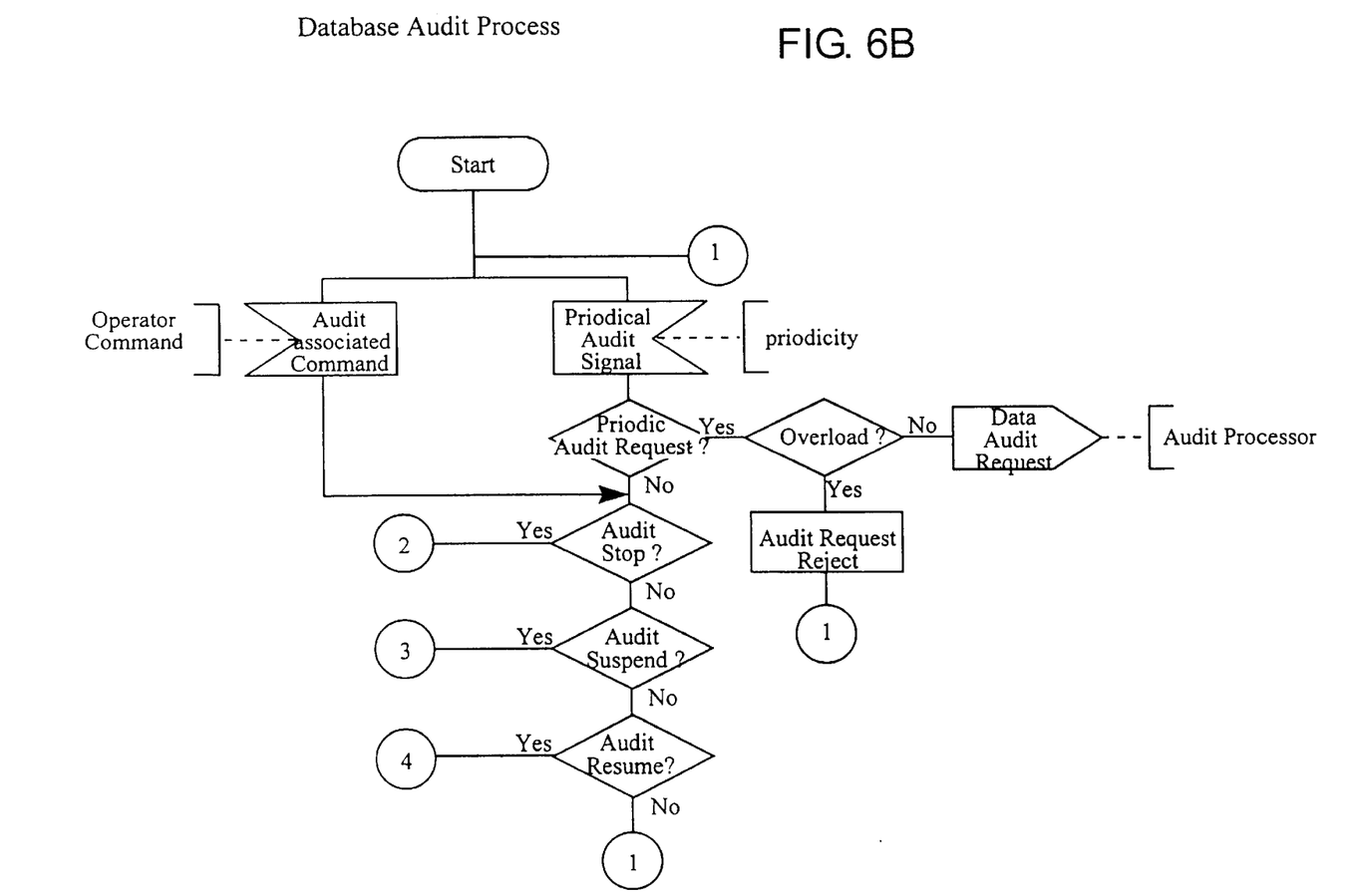
Figure 6C:
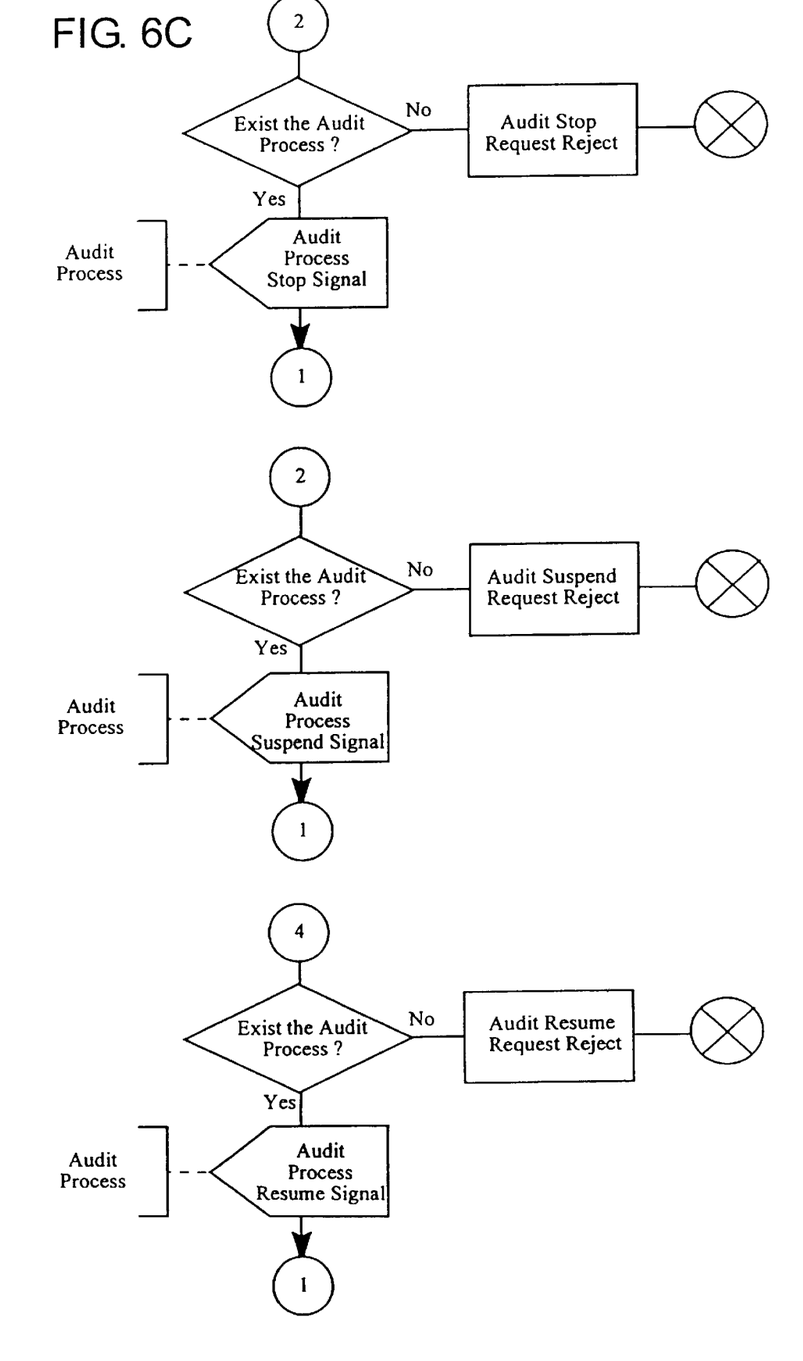

FIG. 5 illustrates a monitoring function basically being in charge of the status of data base and an event management for the data audit function.

The data base monitoring performs three functions which are the data base event management A, the status management of the audit process B, and the data base load management C. There are interaction among three functions.

The data base event management function A manages the time stamp in which the data is updated or searched for the data audit function. At this time, the time stamp is a tuple unit functioned as a data update unit or a data search unit, and means a specific time at which the data base operation is generated by using the tuple unit.

Also, the function 501 of the data base event management function A maintains the number of the valid tuples so as to manage the amount of used storage of the data base.

The function 502 of the status management B of data audit process 303 performs the audit function while scanning the information stored in the data base in the tuple unit, and manages a progress of the audit process in order to perform the suspend and resume functions of the audit process.

The data base load management C manages the queue status for the data search request and the update request to be required to the data base, and measures the load degree of CPU.

When a start request of the audit process is received, both the data concerning a queue of the request adetermineload determine whether a corresponding process is activated or not (503).

The event management 504 according to the audit process status is a cooperating function between the data base event management and the audit process status management, and manages a start time at which the audit process is activated, the audit processing duration until now, and the time at which the next periodic audit process is performed.

Also, the function 504 stores the time from the suspended time to the current time if the monitoring process is suspended during operation, the information for how often are suspended during audit processing once, and stores the total time for the time period about the suspended state if a large number of suspend and resume operations are repeated.

When the suspended audit process is resumed, the function 504 measures the audit processing time from the resumed time, and accumulates it to the time which is consumed to perform the audit until a previous suspend is generated.

The event management 505 according to data base load is a cooperating function between the data base event management A and the data base load management C, together manages the load of the data base every the event of the start, suspend, and resume of the audit, and monitors the increment and decrement degree of the load.

If the value about the queue or CPU, measured by the data base monitor, is over the system defined limit value, the function 505 suspends the operating audit process for a while, firstly processes the data base access request.

And, if the load is to be lower than the limit value while the queue or CPU load are continuously monitored, the suspended audit process is resumed again (505).

DB load-based activation management 506 is a cooperating function between the database scanning information management B and the data base load management C. According to the result of a load measurement requested by the automatic queue, CPU load measurement, or operator command, the function 506 determines whether a start, stop, suspend, and resume operations are activated or not.

The audit process action management 507 activates the process for the start, stop, suspend and resume of the audit process, and is a cooperating function among the data base event management A, the status management B of audit process, and the data base load management C.

When the audit process by the instruction of the operator is performing at the time point for performing the periodic audit, the periodic audit is canceled and a state message indicating other audit process is already alive (507).

The present invention satisfies a system basic requirement being a real-time access in a mobile communication system including at least two data bases, maintains a consistency between two data replicated to each other, accurately controls a relationship between a mobile subscriber and a mobile terminal, and protects the subscriber from abnormal service request which may occur by a stealing of the mobile terminal or a stealing the subscriber number. In addition, the present invention removes the incorrect data and the garbage data which may occur in a system operation, thereby effectively using the data base resource. The above operations are performed in consideration of the data base load, so the total performance of the system is not affected by such operations. Also, the present invention reports the information for the data audit process' status and the incorrect data to the operator, thereby effectively operating the system.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A method for auditing data based on timestamp criteria in replicated data bases in a digital mobile telecommunication system, comprising the steps of:
   (a) when there is a database access request, setting a time stamp about tuple accessed by the request, and managing a start, suspend, stop and resume events for a audit process;
   (b) managing a current status of the audit process, and information necessary for scanning each tuple; and
   (c) managing a request queue for the data base and CPU load.

2. A method for checking a data validity in software modules including a database monitor, a data audit process, and data verifier in each data base, comprising:
   a) first step for performing a data audit process through the database monitor in order to ensure a consistency among registers for storing/managing information for a mobile subscriber in a mobile communication network environment and other register for storing information for a mobile equipment, and performing a data validity check;

b) second step for setting timestamp every a stored tuple is searched or updated, determining the tuple as an invalid data if there is no operation for a given time which is defined as a system parameter during data auditing, and determining incorrect and garbage data for a data validity check; and c) third step for requesting other data base having a replicated data of the tuple to perform a data search when the tuple being the invalid data is reported to the data base monitor, receiving a result of the data search, comparing the result with data of the data verifier, determining the data as a valid data and setting a new timestamp if the data of the data verifier is identical with the data search result, if the data of the data verifier is not identical with the data search result, requesting a paging of a subscriber having the data, modifying the data as other data obtained by a response against the paging, and deleting the data of the subscriber in the data base if there is no response against the paging.

3. The method according to the claim 2, wherein the step (a) comprises:

(a) first step for managing a system parameter such as an audit period or a data lifetime for a data auditing, the system parameter being modified by an operator through an operation command;

(b) second step for starting the audit process on the basis of the audit period which is defined at initial time point of the system or modified by the operator;

(c) third step for monitoring a request queue and load of the data base, when the request queue and the load are over a limit level defined by the system and a corresponding audit process is performed, and suspending the audit process; and (d) fourth step for resuming the suspended audit process if the data base load is lower than the limit level.

4. The method according to claim 2, wherein the data audit process is activated by a audit processing start command of the operator or by a period managed by the data base monitor.

5. The method according to claim 4, wherein the data audit process already activated is incompletely terminated by an audit processing stop command.

6. A method for auditing data in data audit process having four states being an idle state, operator active state, active state, and sleep state, comprising:

a) first step for transitting the idle state to the operator active state when the idle state receives an audit processing start command by the operator active state;

b) second step for transitting the idle state to the active state when the idle state receives the audit processing start command through an audit period;

c) third step for transitting the operator active state to the sleep state when the operator active state receives the audit processing suspend command;

d) fourth step for transitting the active state to the sleep state when an overload of data base is sensed in the active state;

e) fifth step for transitting the sleep state to the operator active state when the sleep state receives the audit processing resume command from the operator; and f) sixth step for transitting the sleep state to the active state when the overload of data is released.

* * * * *